US009883495B2

United States Patent
Papasakellariou et al.

(10) Patent No.: US 9,883,495 B2
(45) Date of Patent: Jan. 30, 2018

(54) EXTENDING PHYSICAL DOWNLINK CONTROL CHANNELS

(71) Applicant: Samsung Electronics Co., Ltd., Gyeonggi-do (KR)

(72) Inventors: Aris Papasakellariou, Houston, TX (US); Joon-Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 289 days.

(21) Appl. No.: 14/044,480

(22) Filed: Oct. 2, 2013

(65) Prior Publication Data

US 2014/0036828 A1 Feb. 6, 2014

Related U.S. Application Data

(63) Continuation of application No. 12/892,343, filed on Sep. 28, 2010.

(Continued)

(51) Int. Cl.
*H04W 72/04* (2009.01)
*H04W 8/26* (2009.01)
(Continued)

(52) U.S. Cl.
CPC ......... *H04W 72/042* (2013.01); *H04L 5/0053* (2013.01); *H04W 8/26* (2013.01);
(Continued)

(58) Field of Classification Search
CPC ..... H04L 5/0053; H04L 5/001; H04W 72/042
(Continued)

(56) References Cited

U.S. PATENT DOCUMENTS

2004/0233874 A1   11/2004   Baker
2007/0167180 A1*   7/2007   Ramesh ............... H04W 48/10
                                                    455/502
(Continued)

FOREIGN PATENT DOCUMENTS

CN   101252783   8/2008
CN   101296140   10/2008
(Continued)

OTHER PUBLICATIONS

3GPP, ASUSTeK, Blind decoding in LTE-A: dated Aug. 28, 2009, #pp. 3.*

(Continued)

*Primary Examiner* — Jae Y Lee
*Assistant Examiner* — Jean F Voltaire
(74) *Attorney, Agent, or Firm* — The Farrell Law Firm, P.C.

(57) ABSTRACT

Methods and apparatuses for transmitting and receiving at least one Downlink Control Information (DCI) in a communication system supporting Carrier Aggregation (CA) are provided. The method for receiving includes receiving information representative of presence of carrier indicator by higher layer signaling from a Node B; receiving information representative of at least one cell indicator by higher layer signaling from the Node B; defining an UE specific search space based on aggregation level, an UE ID, and at least one carrier indicator value, where the UE specific search space includes a set of Physical Downlink Control CHannel (PDCCH) candidates based on the aggregation level; decoding at least one PDCCH including at least one DCI respectively by the UE ID; and acquiring the at least one DCI, wherein the at least one carrier indicator value is based on the at least one cell indicator.

40 Claims, 14 Drawing Sheets

Related U.S. Application Data

(60) Provisional application No. 61/246,380, filed on Sep. 28, 2009, provisional application No. 61/246,387, filed on Sep. 28, 2009.

(51) Int. Cl.
*H04W 24/00* (2009.01)
*H04W 48/12* (2009.01)
*H04W 48/10* (2009.01)
*H04L 5/00* (2006.01)
*H04W 56/00* (2009.01)
*H04W 4/06* (2009.01)

(52) U.S. Cl.
CPC ........... *H04W 24/00* (2013.01); *H04W 48/10* (2013.01); *H04W 48/12* (2013.01); *H04W 72/04* (2013.01); *H04L 5/001* (2013.01); *H04L 5/0092* (2013.01); *H04W 4/06* (2013.01); *H04W 56/00* (2013.01)

(58) Field of Classification Search
USPC .......................................... 370/328–332, 338
See application file for complete search history.

(56) References Cited

U.S. PATENT DOCUMENTS

| | | | |
|---|---|---|---|
| 2008/0232495 | A1 | 9/2008 | Yu et al. |
| 2009/0011784 | A1 | 1/2009 | Kang et al. |
| 2009/0040998 | A1 | 2/2009 | Park |
| 2009/0088148 | A1 | 4/2009 | Chung et al. |
| 2009/0109915 | A1 | 4/2009 | Pasad et al. |
| 2009/0168704 | A1 | 7/2009 | Lee et al. |
| 2009/0181692 | A1 | 7/2009 | Gaal et al. |
| 2009/0196333 | A1 | 8/2009 | Cozzo |
| 2009/0238099 | A1 | 9/2009 | Ahmavaara |
| 2009/0298493 | A1* | 12/2009 | Lin ............... H04W 72/042 455/432.1 |
| 2010/0002647 | A1 | 1/2010 | Ahn et al. |
| 2010/0279628 | A1 | 11/2010 | Love et al. |
| 2011/0038275 | A1* | 2/2011 | Kim ............... H04W 48/16 370/252 |
| 2011/0070845 | A1 | 3/2011 | Chen et al. |
| 2011/0081939 | A1 | 4/2011 | Damnjanovic et al. |
| 2011/0110315 | A1 | 5/2011 | Chen et al. |
| 2013/0094383 | A1 | 4/2013 | Lin |

FOREIGN PATENT DOCUMENTS

| | | |
|---|---|---|
| CN | 101340235 | 1/2009 |
| CN | 101404526 | 4/2009 |
| CN | 101478808 | 7/2009 |
| CN | 101494892 | 7/2009 |
| CN | 101505498 | 8/2009 |
| EP | 1 708 421 | 10/2006 |
| EP | 1 773 075 | 4/2007 |
| JP | 2009-296589 | 12/2009 |
| JP | 2012-525802 | 10/2012 |
| JP | 2013-504942 | 2/2013 |
| KR | 1020080086317 | 9/2008 |
| KR | 1020090017450 | 2/2009 |
| RU | 2 205 512 | 5/2003 |
| RU | 2005138495 | 6/2006 |
| WO | WO 2009/022879 | 2/2009 |
| WO | WO 2009/041779 | 4/2009 |
| WO | WO 2009/116751 | 9/2009 |

OTHER PUBLICATIONS

3GPP, Motorola, PDCCH Design for Carrier Aggregation: dated Jul. 3, 2009, #pp. 5.*
ASUSTek (Blind decoding in LTE-Advanced: dated Aug. 28, 2009).*
Motorola (PDCCH Design for Carrier Aggregation: dated Jul. 3, 2009).*
ASUSTek (Blind decoding in LTE-A, Aug. 28, 2009).*
Ericcsson (PDCCH Blind decoding, Feb. 11, 2008).*
ZTE (Consideration on Carrier Indicator, Aug. 28, 2009).*
Nortel, "On PDCCH Mapping Randomization", R1-083856, 3GPP TSG-RAN WG1#54bis, Sep. 29-Oct. 3, 2008.
Nokia, Nokia Siemens Networks, "PDCCH Decoding Complexity and Associated Hashing Functions", R1-081447, 3GPP TSG RAN WG1 Meeting #52bis, Mar. 31-Apr. 4, 2008.
Qualcomm Europe, "Remaining Issues on PDCCH Search Space Definitions", R1-081481, 3GPP TSG RAN1 #52bis, Mar. 31-Apr. 4, 2008.
Ericsson, "PDCCH Blind Decoding—Outcome of Offline Discussions", R1-081101, XP-002534832, Feb. 11, 2009.
Motorola, "PDCCH Design for Carrier Aggregation and Post Rel-8 Features", R1-092641, 3GPP TSG RAN1 #57bis, Jun. 29-Jul. 3, 2009.
ASUSTeK, "Blind decoding in LTE-Advanced", R1-093280, 3GPP TSG RAN WG1, Meeting #58, Aug. 24-28, 2009.
ZTE, "Downlink Control Structure for LTE-A", R1-090628, 3GPP TSG-RAN WG1 Meeting #56, Feb. 9-13, 2009.
Qualcomm Europe, "Notion of Anchor Carrier in LTE-A", R1-091458, 3GPP TSG RAN WG1 #56bis, Mar. 23-27, 2009.
ZTE, "Considerations on Carrier Indicator", R1-093207, 3GPP TSG-RAN WG1 Meeting #58, Aug. 24-28, 2009.
Panasonic, "Component Carrier Indication Scheme for Carrier Aggregation", R1-093465, 3GPP TSG-RAN WG1 Meeting #58, Aug. 24-28, 2009.
3rd Generation Partnership Project; Technical Specification Group Radio Access Network; Evolved Universal Terrestrial Radio Access (E-UTRA); Physical Layer Procedures (Release 8), 3GPP TS 36.213 V8.7.0, May 2009.
Nokia, Nokia Siemens Networks, DL Control Signalling to Support Extended Bandwidth, R1-091362, 3GPP TSG-RAN WG1 Meeting #56bis, Mar. 18, 2009.
Alcatel-Lucent et al., "Way Forward on PDCCH for Bandwidth Extension in LTE-A", R1-093699, 3GPP TSG RAN WG1 Meeting #58, Aug. 28, 2009.
CATT, "DL Control Channel Scheme for LTE-A", R1-091994, 3GPP TSG RAN WG1 Meeting #57, Apr. 28, 2009.
Chinese Office Action dated Nov. 1, 2017 issued in counterpart application No. 201410564589.8, 12 pages.

* cited by examiner

EXTENDING PHYSICAL DOWNLINK CONTROL CHANNELS

PRIORITY

This application is a Continuation application of U.S. patent application Ser. No. 12/892,343, which was filed in the United States Patent and Trademark Office on Sep. 28, 2010, and claims priority under 35 U.S.C. § 119(e) to U.S. Provisional Patent Application Nos. 61/246,380 and 61/246,387, which were both filed in the U.S. Patent and Trademark Office on Sep. 28, 2009, the entire contents of each of which are incorporated herein by reference.

BACKGROUND OF THE INVENTION

1. Field of the Invention

The present invention is directed to wireless communication systems and, more specifically, to extending a Physical Downlink Control CHannel (PDCCH) from supporting communication in a single cell to supporting communication in multiple cells.

2. Description of the Art

A communication system includes a DownLink (DL) that supports the transmissions of signals from a Base Station (BS) (or Node B) to User Equipments (UEs), and an UpLink (UL) that supports transmissions of signals from UEs to the Node B. A UE, also commonly referred to as a terminal or a mobile station, may be fixed or mobile and may be a wireless device, a cellular phone, a personal computer device, etc. A Node B is generally a fixed station and may also be referred to as a Base Transceiver System (BTS), an access point, or some other similar terminology.

The DL signals include data signals that carry information content, control signals, and Reference Signals (RS), which are also known as pilot signals. The Node B transmits data information to a UE through a Physical Downlink Shared CHannel (PDSCH) and transmits control information to a UE through a PDCCH.

The UL signals also include data signals, control signals, and RSs. A UE transmits data information to the Node B through a Physical Uplink Shared CHannel (PUSCH) and transmits control information through a Physical Uplink Control CHannel (PUCCH). It is also possible for UEs to transmit control information through the PUSCH.

Downlink Control Information (DCI) serves several purposes and is transmitted in DCI formats through the PDCCH. For example, DCI formats are used to provide DL Scheduling Assignments (SAs) for PDSCH receptions by the UEs, UL SAs for PUSCH transmissions by the UEs, or Transmission Power Control (TPC) commands for PUSCH receptions or PUCCH transmissions from the UEs. DCI formats also provide scheduling information for a Paging CHannel (PCH), for a response by the Node B to Random Access CHannels (RACH) transmitted by the UEs, and for Secondary Information Blocks (SIBs) providing broadcast control information from the Node B. The DCI format for transmitting the TPC commands will be referred to as DCI format 3 and the DCI format for transmitting the scheduling information for the transmission of either PCH, RACH response, or SIBs will be referred to as DCI format 1C.

Typically, the PDCCH is a major part of the total DL overhead and directly impacts the achievable DL cell throughput. A conventional method for reducing PDCCH overhead is to scale its size according to the resources required to transmit the DCI formats during a DL Transmission Time Interval (TTI). Assuming Orthogonal Frequency Division Multiple Access (OFDMA) as the DL transmission method, a Control Channel Format Indicator (CCFI) parameter transmitted through the Physical Control Format Indicator CHannel (PCFICH) can be used to indicate the number of OFDM symbols occupied by the PDCCH.

FIG. 1 is a diagram illustrating a structure for the PDCCH transmission in the DL TTI, which for simplicity includes one sub-frame having M OFDM symbols.

Referring to FIG. 1, the PDCCH 120 occupies the first N symbols 110. The remaining M-N symbols of the sub-frame are assumed to be primarily used for PDSCH transmission 130. The PCFICH 140 is transmitted in some sub-carriers, also referred to as Resource Elements (REs), of the first symbol. The PCFICH includes 2 bits indicating a PDCCH size of M=1, M=2, or M=3 OFDM symbols. Additionally, some sub-frame symbols include RS REs, 150 and 160, which are common to all UEs for each of the Node B transmitter antennas, which in FIG. 1 are assumed to be two. The RSs enable a UE to obtain a channel estimate for its DL channel medium and to perform various other measurements and functions. The PDSCH typically occupies the remaining REs.

Additional control channels may be transmitted in the PDCCH region but, for brevity, they are not illustrated in FIG. 1. For example, to support Hybrid Automatic Repeat reQuest (HARQ) for PUSCH transmissions, a Physical Hybrid-HARQ Indicator CHannel (PHICH) may be transmitted by the Node B, in a similar manner as the PCFICH, to indicate to groups of UEs whether or not their previous PUSCH transmission was received by the Node B.

The Node B separately codes and transmits each DCI format through a PDCCH.

FIG. 2 is a block diagram illustrating a conventional processing chain for transmitting a DCI format.

Referring to FIG. 2, the Medium Access Control (MAC) layer IDentity of the UE (or UE ID), for which a DCI format is intended, masks the Cyclic Redundancy Check (CRC) of the DCI format codeword in order to enable the reference UE to identify that the particular DCI format is intended for the reference UE. The CRC 220 of the (non-coded) DCI format bits 210 is computed and is subsequently masked 230 using the eXclusive OR (XOR) operation between CRC bits and the UE ID 240, i.e., XOR(0,0)=0, XOR(0,1)=1, XOR(1,0)=1, and XOR(1,1)=0.

The masked CRC is then appended to the DCI format bits 250, channel coding 260 is performed, for example, using a convolutional code, followed by rate matching 270 to the allocated PDCCH resources, and then interleaving and modulation 280. Thereafter, a control signal 290 is transmitted.

A UE receiver performs the reverse operations of the Node B transmitter to determine whether a DCI format in the PDCCH was intended for the UE.

FIG. 3 is a block diagram illustrating a conventional processing chain for receiving a DCI format.

Referring to FIG. 3, a received control signal, i.e., a PDCCH, 310 is demodulated and the resulting bits are de-interleaved 320. Rate matching applied in the Node B transmitter is restored 330, and the output is subsequently decoded 340. After decoding, the DCI format bits 360 are obtained, after extracting the CRC bits 350, which are then de-masked 370 by applying the XOR operation with the UE ID 380. Thereafter, the UE performs a CRC test 390. If the CRC test passes, the UE considers the DCI format as being valid and determines the parameters for PDSCH reception (DL DCI format) or PUSCH transmission (UL DCI format). If the CRC test does not pass, the UE disregards the DCI format.

The information bits of the DCI format correspond to several Information Elements (IEs) such as, for example, the Resource Allocation (RA) IE indicating the part of the operating BandWidth (BW) allocated to a UE for PDSCH reception or PUSCH transmission, the Modulation and Coding Scheme (MCS) IE, the IE related to the HARQ operation, etc. The BW unit for PDSCH or PUSCH transmissions is assumed to consist of several REs, e.g., 12 REs, and will be referred to as a Physical Resource Block (PRB).

PDCCHs for a UE are not transmitted at fixed and predetermined locations and do not have predetermined coding rates. Consequently, a UE performs multiple PDCCH decoding operations in each sub-frame to determine whether any of the PDCCHs transmitted by the Node B are intended for the UE. In order to assist UEs with the multiple PDCCH decoding operations, the PDCCH REs are grouped into Control Channel Elements (CCEs) in the logical domain. For a given number of DCI format bits as illustrated in FIG. 2, the number of CCEs for the respective PDCCH transmission depends on the channel coding rate. For UEs experiencing low or high Signal-to-Interference and Noise Ratio (SINR) in the DL, the Node B may respectively use a low or high channel coding rate in order to achieve a desired PDCCH BLock Error Rate (BLER). Therefore, a PDCCH transmission to a UE experiencing low DL SINR typically requires more CCEs that a PDCCH transmission to a UE experiencing high DL SINR. Alternatively, different power boosting of CCE REs may also be used in order to achieve a target BLER. Typical CCE aggregation levels for PDCCH transmissions are assumed to follow a "tree-based" structure, for example, 1, 2, 4, and 8 CCEs.

For the PDCCH decoding process, a UE may determine a search space for a candidate PDCCH, after it restores the CCEs in the logical domain, according to a common set of CCEs for all UEs in a UE-Common Search Space (UE-CSS) and according to a UE-specific set of CCEs in a UE-Dedicated Search Space (UE-DSS). The UE-CSS includes the first C CCEs in the logical domain. The UE-DSS may be determined according to a pseudo-random function having UE-common parameters as inputs, such as the sub-frame number or the total number of PDCCH CCEs in the sub-frame, and UE-specific parameters such as the identity assigned to a UE (UE_ID).

For example, for CCE aggregation levels $L \in \{1,2,4,8\}$, the CCEs corresponding to PDCCH candidate m can be given by Equation (1).

$$L \cdot \{(Y_k+m) \bmod \lfloor N_{CCE,k}/L \rfloor\}+i \quad (1)$$

In Equation (1), $N_{CCE,k}$ is a total number of CCEs in sub-frame k, i=0, ..., L−1, m=0, ..., $M^{(L)}$−1, and $M^{(L)}$ is a number of PDCCH candidates for the respective CCE aggregation levels. Exemplary values of $M^{(L)}$ for $L \in \{1,2,4,8\}$ are, respectively, $\{6, 6, 2, 2\}$. For the UE-CSS, $Y_k$=0. For the UE-DSS, $Y_k$=(A·$Y_{k-1}$)modD where, for example, $Y_{-1}$=UE_ID≠0, A=39827 and D=65537.

DCI formats conveying information to multiple UEs, such as DCI format 3 or DCI format 1C, are transmitted in the UE-CSS. If enough CCEs remain after transmitting DCI formats 3 and 1C, the UE-CSS may also convey some DCI formats for PDSCH receptions or PUSCH transmissions by UEs. The UE-DSS exclusively conveys DCI formats for PDSCH receptions or PUSCH transmissions. In an exemplary setup, the UE-CSS includes 16 CCEs and supports 2 PDCCH with L=8 CCEs, or 4 PDCCH with L=4 CCEs, or 1 PDCCH with L=8 CCEs and 2 PDCCH with L=4 CCEs. The CCEs for the UE-CSS are placed first in the logical domain (prior to interleaving).

FIG. 4 illustrates a conventional PDCCH transmission process. After channel coding and rate matching, as illustrated in FIG. 2, the encoded DCI format bits are mapped to CCEs in the logical domain.

Referring to FIG. 4, the first 4 CCEs (L=4), CCE1 401, CCE2 402, CCE3 403, and CCE4 404 are used for DCI format transmission to UE 1. The next 2 CCEs (L=2), CCE5 411 and CCE6 412, are used for DCI format transmission to UE2. The next 2 CCEs (L=2), CCE7 421 and CCE8 422, are used for DCI format transmission to UE3. The last CCE (L=1), CCE9 431, is used for DCI format transmission to UE4.

The DCI format bits may be scrambled 440 using a binary scrambling code, which is typically cell-specific, and are subsequently modulated 450. Each CCE is further divided into mini-CCEs. For example, a CCE including 36 REs can be divided into 9 mini-CCEs, each having 4 REs.

Interleaving 460 is applied among mini-CCEs (blocks of 4 QPSK symbols). For example, a block interleaver may be used where the interleaving is performed on symbol-quadruplets (4 Quadrature Phase Shift Keying (QPSK) symbols corresponding to the 4 REs of a mini-CCE) instead of on individual bits. After interleaving the mini-CCEs, the resulting series of QPSK symbols may be shifted by J symbols 470, and then each QPSK symbol is mapped to an RE 480 in the PDCCH region of the DL sub-frame. Therefore, in addition to the RS from the Node B transmitter antennas, 491 and 492, and other control channels such as the PCFICH 493 and the PHICH (not shown), the REs in the PDCCH include QPSK symbols corresponding to DCI format for UE1 494, UE2 495, UE3 496, and UE4 497.

In order to support higher data rates and signal transmission in BWs larger than the BWs of individual carriers (or cells) supporting legacy communications, aggregation of multiple carriers (or cells) can be used. For example, to support communication over 100 MHz, aggregation of five 20 MHz carriers (or cells) can be used. For ease of description, UEs that can only operate over a single carrier (or cell) will be referred to herein as Legacy-UEs (L-UEs) while UEs that can operate over multiple carriers (or cells) will be referred to herein as Advanced-UEs (A-UEs).

FIG. 5 illustrates a principle of carrier aggregation. An operating BW of 100 MHz includes the aggregation of 5 (contiguous, for simplicity) carriers, 521, 522, 523, 524, and 525, each having a BW of 20 MHz. Similarly to the sub-frame structure for communication over a single carrier in FIG. 1, the sub-frame structure for communication over multiple carriers includes a PDCCH region, for example, 531 through 535, and a PDSCH region, for example, 541 and 545.

FIG. 6 is a diagram illustrating a conventional heterogeneous network deployment.

Referring to FIG. 6, an area covered by a macro-Node B 610 encompasses areas covered by micro-Node Bs 620 and 630. Because the macro-Node B covers a larger area than a micro-Node B, its transmission power is substantially larger than the transmission power of a micro-Node B. Consequently, for topologies such as illustrated in FIG. 6, the signals transmitted by a macro-Node B can cause severe interference to the signals transmitted by a micro-Node B. Interference coordination techniques can be applied to PDSCH transmissions to mitigate macro-to-micro interference using different PRBs between PDSCH signal transmissions from the macro-Node B and a micro-Node B. However, such interference coordination is not possible for the PDCCH because the CCEs are pseudo-randomly distributed over the entire operating BW, as was previously described.

To avoid interference to PDCCH transmissions in a micro-cell, all PDCCH transmissions can be in the macro-cell and a Carrier Indicator, or Cell Indicator, (CI) IE can be introduced in the DCI formats to indicate whether the DCI format is for the macro-cell or for the micro-cell. For example, a CI IE of 2 bits can indicate whether the DCI format is for the macro-cell or for any of a maximum of three micro-cells.

In addition to providing PDCCH interference avoidance, PDCCH transmission in certain cells may be avoided for practical reasons. For example, it is desirable to avoid PDCCH transmissions in cells with small BW as they are inefficient and lead to large respective overhead. Also, PDSCH transmissions in a cell can be optimized to occur over all DL sub-frame symbols if transmissions of PDCCH and of other supporting signals such as UE-common RS, are avoided.

The CI functionality can accommodate:

PUSCH scheduling in the UL of multiple cells through PDCCH transmission in a single cell;

PDSCH scheduling in the DL of multiple cells through PDCCH transmission in a single cell; and PDCCH transmission in a first cell (macro-cell) and in a second cell (micro-cell).

FIG. 7 is a diagram illustrating a conventional PUSCH scheduling in the UL of multiple cells through PDCCH transmission in a single cell.

Referring to FIG. 7, a PDCCH in a single cell 710 is associated with the UL of two cells, 720 and 730. Consequently, PDCCHs scheduling PUSCH transmissions from Cell 1 and Cell 2 are transmitted in a single cell and the cell of PUSCH transmission can be identified by a CI IE consisting of 1 bit.

FIG. 8 is a diagram illustrating a conventional PDSCH scheduling in a DL of multiple cells through PDCCH transmission in a single cell.

Referring to FIG. 8, only Cell1 810 and Cell3 830 transmit PDCCH. Scheduling for Cell2 820 is performed through PDCCH transmission in Cell1 810 and scheduling for Cell4 840 and Cell5 850 is performed through PDCCH transmissions in Cell3 830.

FIG. 9 is a diagram illustrating a conventional PDCCH transmission in a first cell (macro-cell) and in a second cell (micro-cell), which may occur to avoid interference in PDCCH transmissions between a macro-cell and a micro-cell.

Referring to FIG. 9, although both macro-cell and micro-cell may have PDSCH transmissions in Cell1 910 and Cell2 920, the macro-cell transmits PDCCH only in Cell1 910 and the micro-cell transmit PDCCH only in Cell2 920.

One issue for supporting PDCCH transmissions using a CI is the PDCCH size. In communication systems having a single cell, the PDCCH is assumed to be limited to a maximum number of M OFDM symbols. In communication systems having multiple cells and having PDCCH transmission in a single cell, this limitation of the PDCCH size may cause scheduling restrictions. In general, the PDCCH size may need to be increased if the PDCCH in one cell performs scheduling in multiple cells.

For the UE-CSS, which is assumed to include a fixed number of CCEs, it may not be possible to transmit additional PDCCH corresponding to additional cells.

For the UE-DSS, modification and expansion is needed in order to transmit multiple DCI formats to a UE in the PDCCH region of a single cell.

For the blind decoding operations a UE needs to perform, their number may scale linearly with the number of cells for which PDCCH is transmitted in a single cell. It is desirable to avoid such an increase in order to avoid the associated impact on the UE receiver complexity.

Therefore, there is a need to expand the PDCCH region in a single cell to support PDCCH transmissions for scheduling in multiple cells.

There is a further need to expand the UE-CSS in a single cell to enable PDCCH transmission conveying UE-common information for multiple cells.

There is another need to expand the capacity of the UE-DSS in a single cell for scheduling over multiple cells.

Additionally, there is another need to reduce the number of blind decoding operations a UE needs to perform.

SUMMARY OF THE INVENTION

Accordingly, the present invention has been designed to solve at least the aforementioned limitations and problems in the prior art and to provide the following advantages. An aspect of the present invention is to provide methods and apparatus for expanding a control region in a single cell from supporting transmission of DCI to a UE for communication over the single cell to supporting transmission of DCI to the UE for communication over multiple cells.

According to an aspect of the present invention, a method for receipt of at least one Downlink Control Information (DCI) in a communication system supporting Carrier Aggregation (CA) is provided. The method includes receiving information representative of presence of carrier indicator by higher layer signaling from a Node B; receiving information representative of at least one cell indicator by higher layer signaling from the Node B; defining an UE specific search space based on aggregation level, an UE ID, and at least one carrier indicator value, where the UE specific search space includes a set of Physical Downlink Control CHannel (PDCCH) candidates based on the aggregation level; decoding at least one PDCCH including at least one DCI respectively by the UE ID; and acquiring the at least one DCI, wherein the at least one carrier indicator value is based on the at least one cell indicator.

According to another aspect of the present invention, an apparatus for receipt of at least one Downlink Control Information (DCI) in a communication system supporting Carrier Aggregation (CA) is provided. The apparatus is configured to receive information representative of presence of carrier indicator by higher layer signaling from a Node B; receive information representative of at least one cell indicator by higher layer signaling from the Node B; define an UE specific search space based on aggregation level, an UE ID, and at least one carrier indicator value, where the UE specific search space includes a set of Physical Downlink Control CHannel (PDCCH) candidates based on the aggregation level; decode at least one PDCCH including at least one DCI respectively by the UE ID; and acquire the at least one DCI, wherein the at least one carrier indicator value is based on the at least one cell indicator.

According to another aspect of the present invention, a method for transmission of at least one Downlink Control Information (DCI) in a communication system supporting Carrier Aggregation (CA) is provided. The method includes transmitting information representative of presence of carrier indicator by higher layer signaling to an User Equipment (UE); and transmitting information representative of at least one cell indicator by higher layer signaling to the UE, wherein an UE specific search space based on aggregation level, an UE ID, and at least one carrier indicator value are defined, where the UE specific search space includes a set of Physical Downlink Control CHannel (PDCCH) candidates based on the aggregation level, wherein at least one PDCCH includes at least one DCI respectively by the UE ID, and wherein the at least one carrier indicator value is based on the at least one cell indicator.

According another aspect of the present invention, an apparatus for transmission of at least one Downlink Control Information (DCI) in a communication system supporting Carrier Aggregation (CA) is provided. The apparatus is configured transmit information representative of presence of carrier indicator by higher layer signaling to an User Equipment (UE); and transmit information representative of at least one cell indicator by higher layer signaling to the UE, wherein an UE specific search space based on aggregation level, an UE ID, and at least one carrier indicator value are defined, where the UE specific search space includes a set of Physical Downlink Control CHannel (PDCCH) candidates based on the aggregation level, wherein at least one PDCCH includes at least one DCI respectively by the UE ID, and wherein the at least one carrier indicator value is based on the at least one cell indicator.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. This invention may, however, be embodied in many different forms and should not be construed as limited to the embodiments set forth herein. Rather, these embodiments are provided so that this disclosure will be thorough and complete and will fully convey the scope of the invention to those skilled in the art.

Additionally, although the present invention is described in relation to an Orthogonal Frequency Division Multiple Access (OFDMA) communication system, it also applies to Frequency Division Multiplexing (FDM) systems and to Single-Carrier Frequency Division Multiple Access (SC-FDMA), OFDM, FDMA, Discrete Fourier Transform (DFT)-spread OFDM, DFT-spread OFDMA, SC-OFDMA, and SC-OFDM.

In accordance with an embodiment of the present invention, an A-UE is semi-statically configured, for example, through Radio Resource Control (RRC) signaling, the cells over which it may have PDSCH reception or PUSCH transmission. A link between the DL and the UL in those cells may also be configured. The inclusion of the CI IE in DCI formats can be either UE-specific or cell-specific. When the CI IE in DCI formats is UE-specific, each A-UE is informed through higher layer signaling (MAC or RRC signaling) whether its assigned DCI formats in a cell include a CI IE. When the CI IE in DCI formats is cell-specific, the Node B may broadcast whether a CI IE is included in the DCI formats. In both cases, the values of the CI to be monitored by an A-UE are also included. The DCI formats having the CI IE may be all DCI formats or a predetermined subset of DCI formats. For example, DCI formats in the UE-CSS may not contain CI while DCI formats in the UE-DSS may contain CI.

Figure 1:
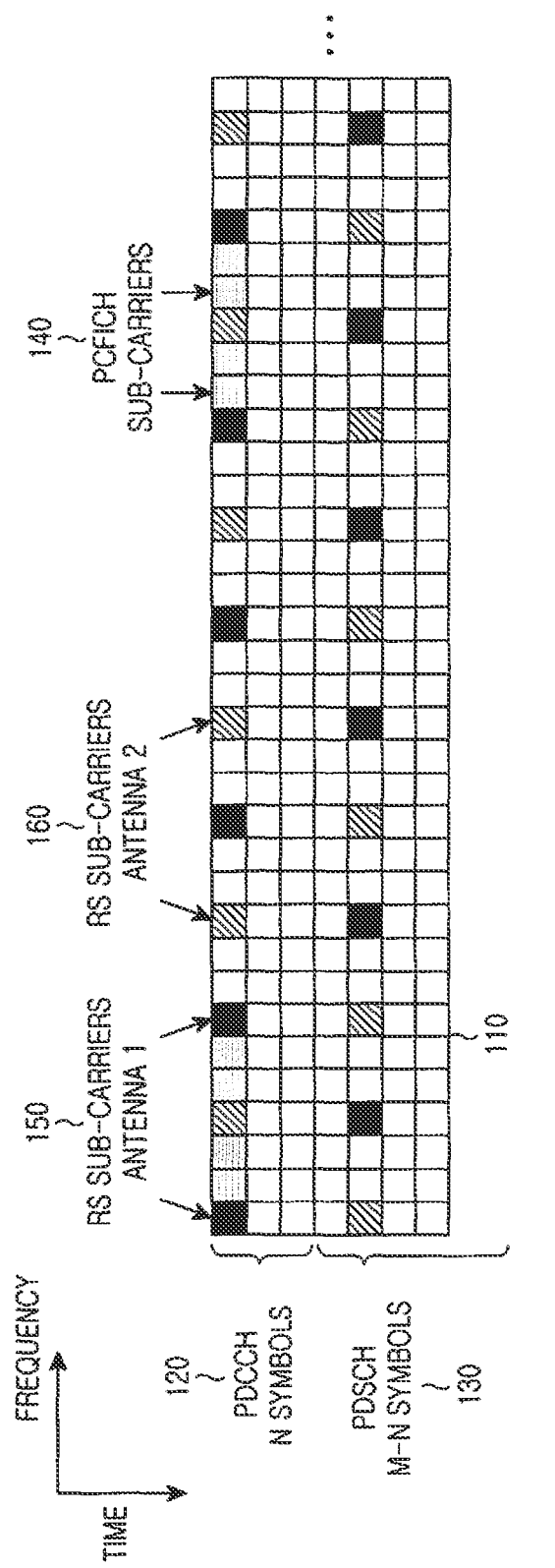
FIG. 1 is a diagram illustrating a conventional structure for PDCCH transmission.
Figure 2:
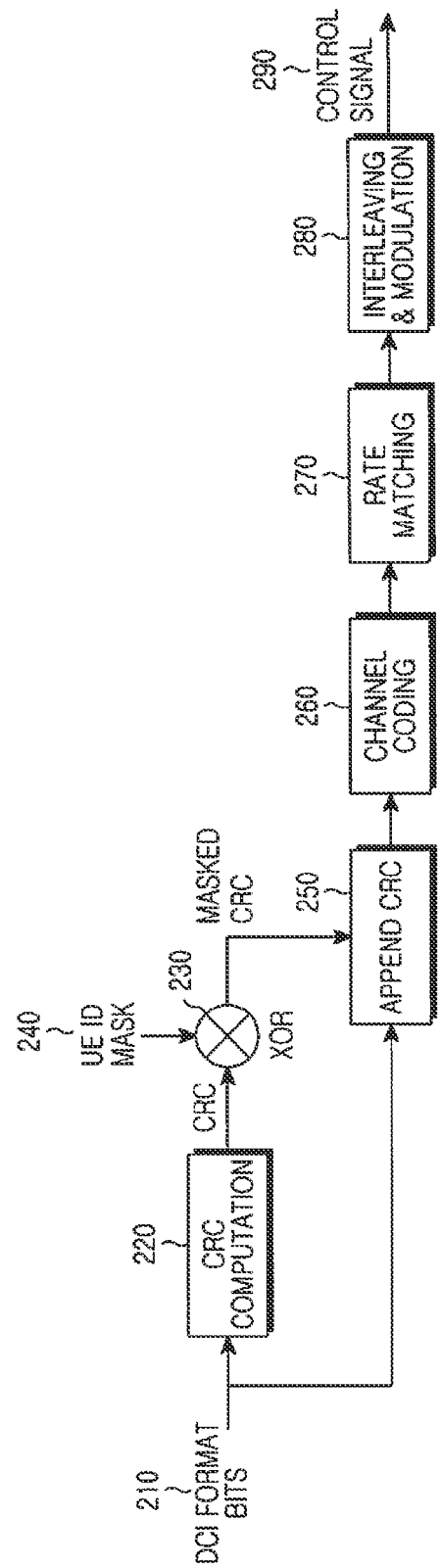
FIG. 2 is a block diagram illustrating a conventional processing chain for transmitting a DCI format.
Figure 3:
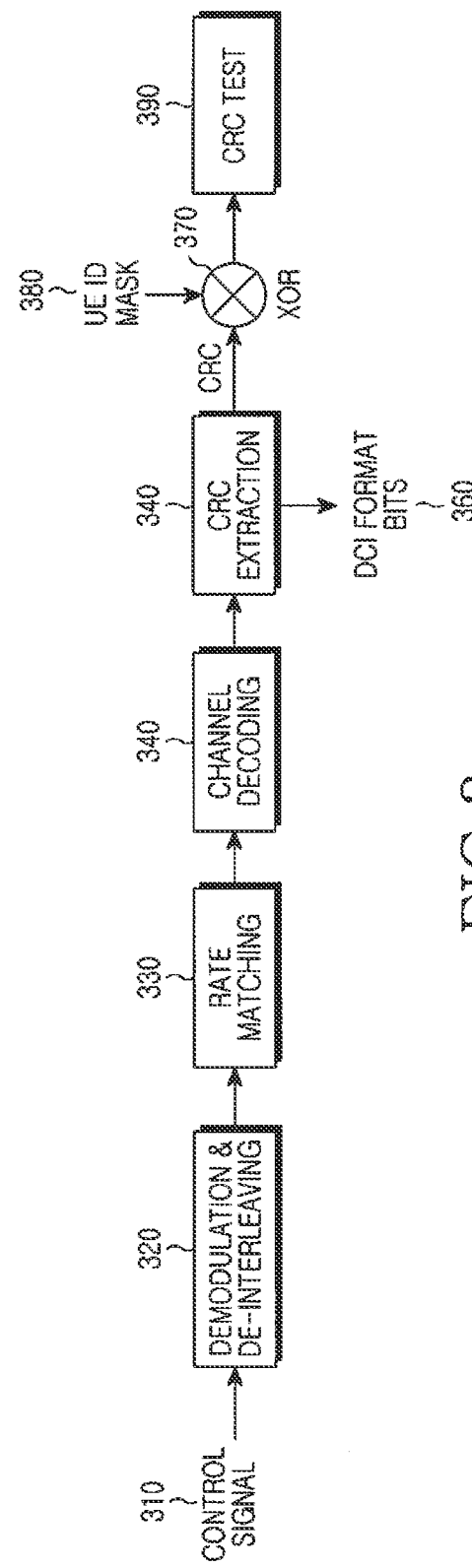
FIG. 3 is a block diagram illustrating a conventional processing chain for receiving a DCI format.
Figure 4:
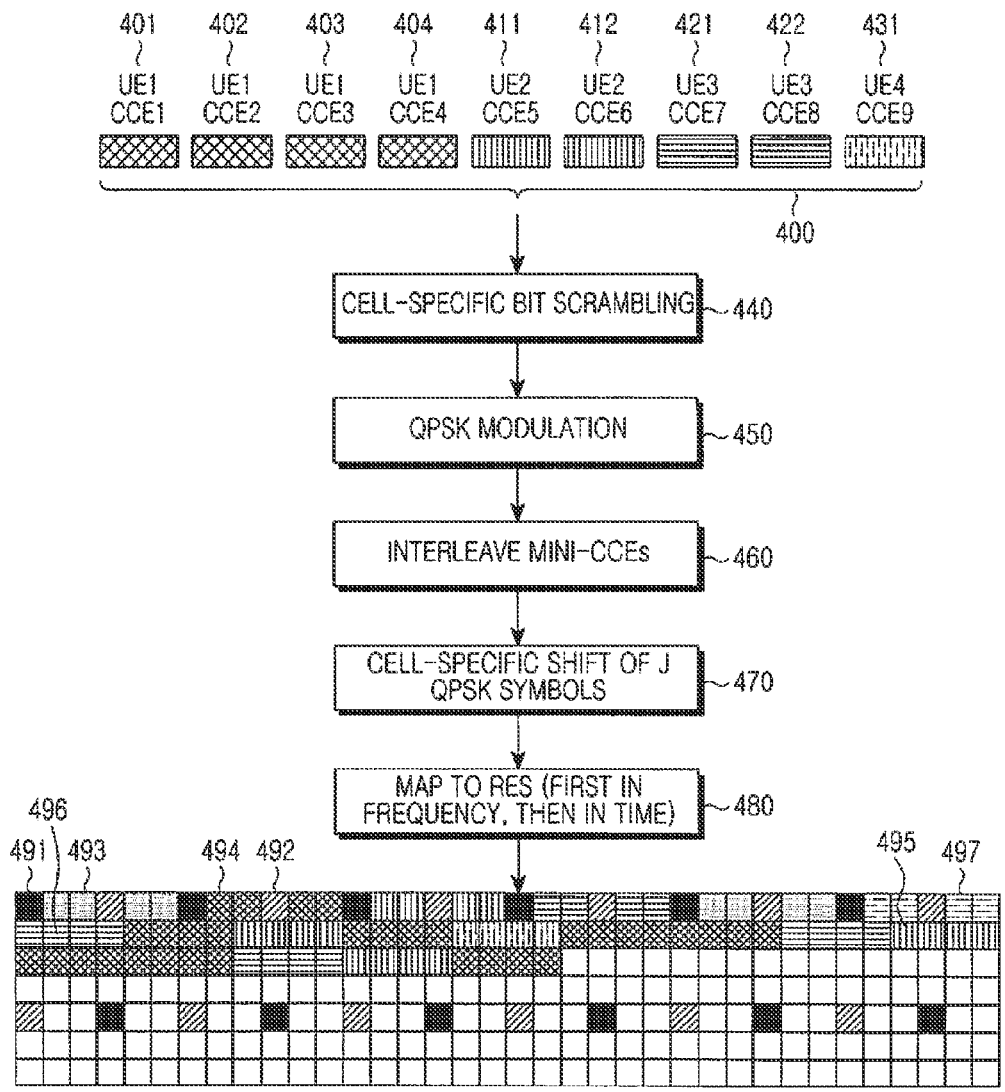
FIG. 4 is a diagram illustrating a conventional PDCCH transmission process.
Figure 5:
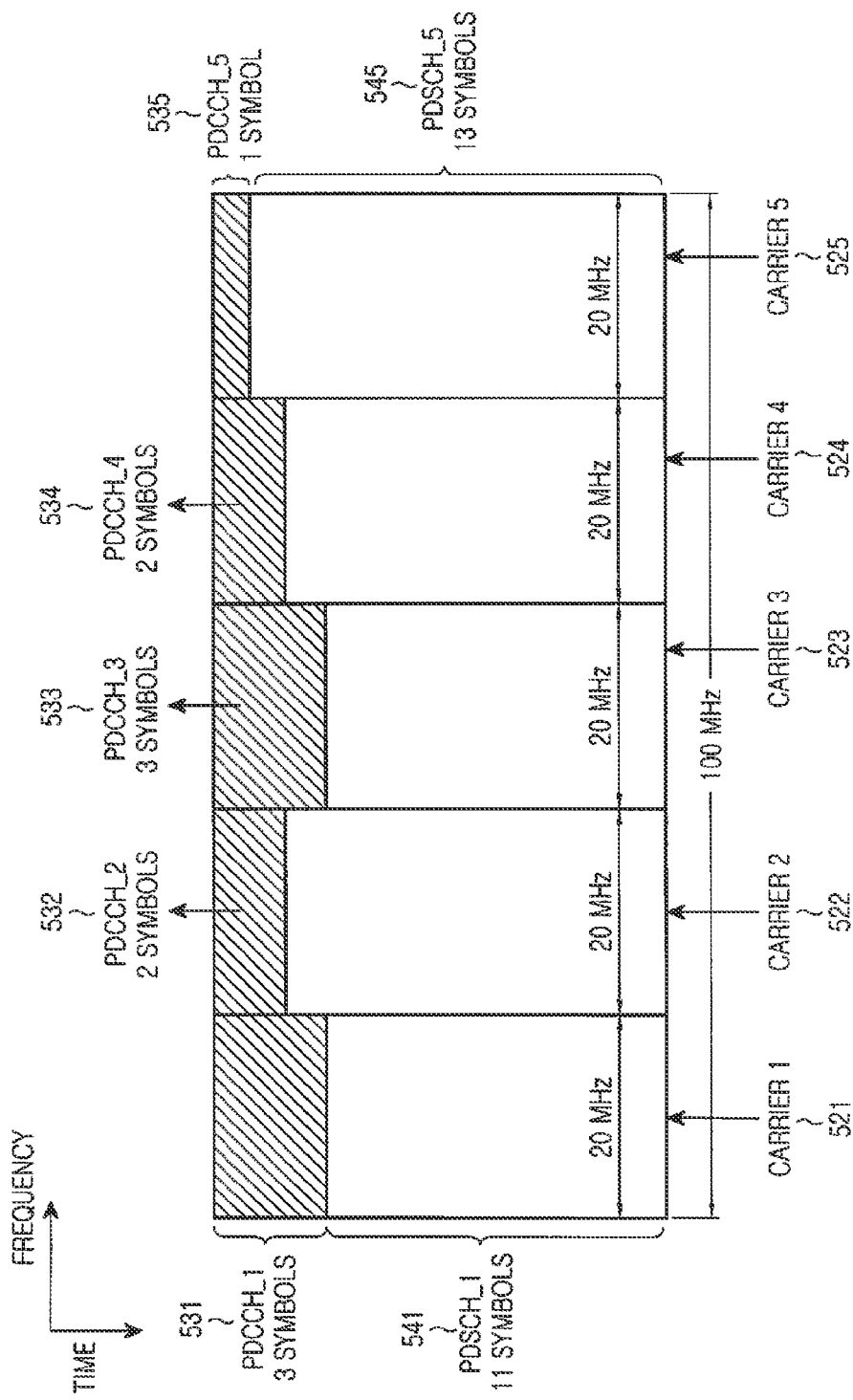
FIG. 5 is a diagram illustrating a principle of carrier aggregation.
Figure 6:
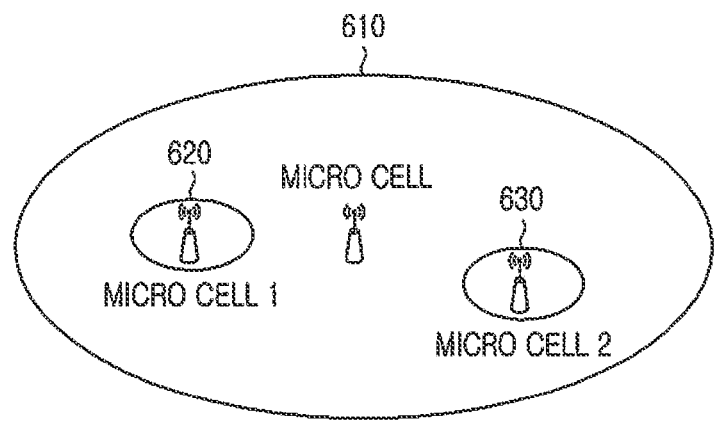
FIG. 6 is a diagram illustrating a conventional heterogeneous network deployment.
Figure 7:
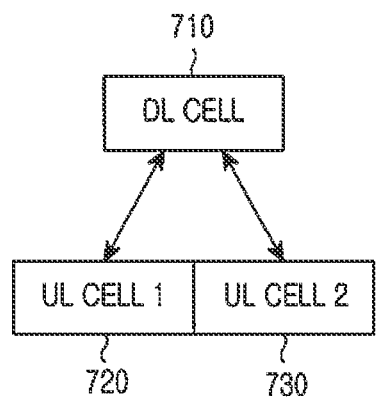
FIG. 7 is a diagram illustrating a conventional PUSCH scheduling in a UL of multiple cells through PDCCH transmission in a single cell.
Figure 8:
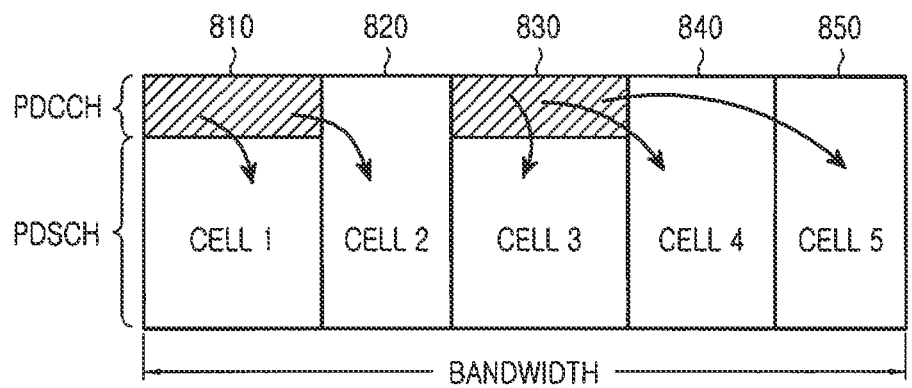
FIG. 8 is a diagram illustrating a conventional PDSCH scheduling in a DL of multiple cells through PDCCH transmission in a single cell.
Figure 9:
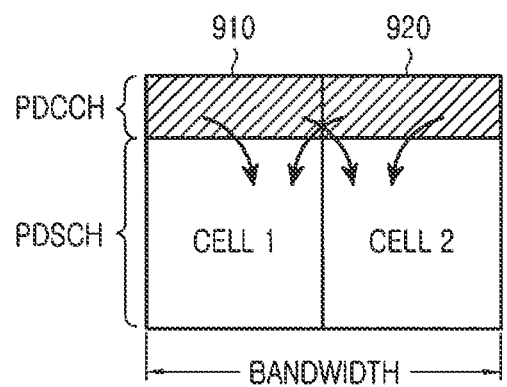
FIG. 9 is a diagram illustrating a conventional PDCCH transmission in a first cell (macro-cell) and in a second cell (micro-cell)
Figure 10:
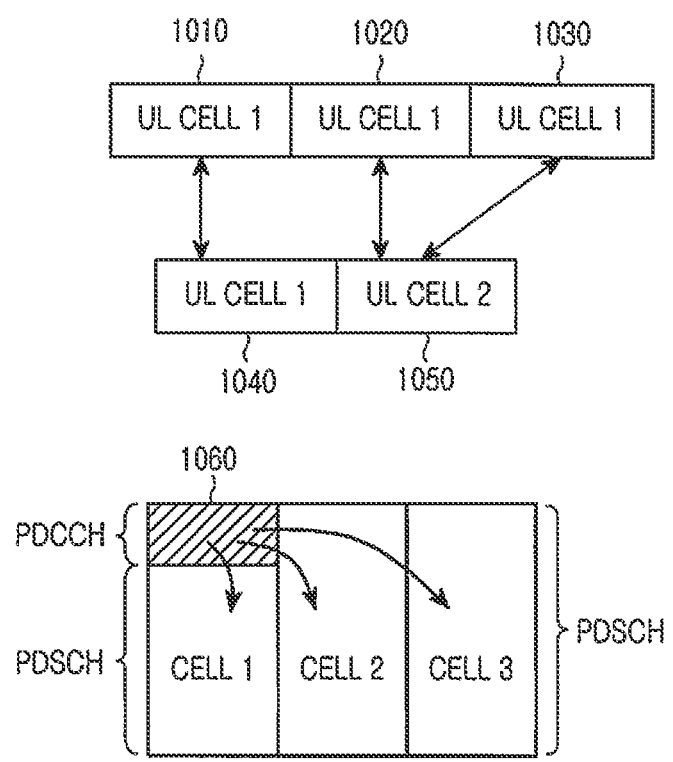
FIG. 10 is a diagram illustrating a method of informing an A-UE whether a CI IE is included in DCI formats in a UE-specific manner, according to an embodiment of the present invention.

FIG. 10 is a diagram illustrating a method of informing an A-UE whether a CI IE is included in DCI formats in a UE-specific manner, according to an embodiment of the present invention.

Referring to FIG. 10, an A-UE is configured in the DL of Cell1 1010, Cell2 1020, and Cell3 1030 for PDSCH reception and in the UL of Cell1 1040 and Cell2 1050 for PUSCH transmission. The cells of PDCCH transmission are also informed to the A-UE through higher layer signaling.

In FIG. 10, a PDCCH is transmitted only in Cell1 1060. For example, the DL and UL for Cell1 may correspond to a macro-cell, while the DL and UL of Cell2 may correspond to a first micro-cell and the DL of Cell3, and the UL of Cell2 can correspond to a second micro-cell. DCI formats associated with PUSCH transmissions or with TPC for PUSCH or PUCCH transmissions (DCI format 3) will be referred to as UL DCI formats. The remaining DCI formats are associated with PDSCH receptions and will be referred to as DL DCI formats.

For the setup in FIG. 10, DL DCI formats to the UE include a CI IE having 2 bits. For example, for the DL, the CI values of '00', '01", and "10" can correspond to Cell1, Cell2, and Cell3, respectively, while the CI value "11" is unused. Similarly, for the UL, the CI values of '0' and "1" can correspond to Cell1 and Cell2, respectively. In general, the number of bits for the CI IE can be different between DL DCI formats and UL DCI formats (including, for example, not having any CI IE bits in UL DCI formats while having CI IE bits in DL DCI formats). The association between CI values and Cells may also be implicitly determined. For example, ascending CI values of "00", "01", "10", and "11" can be mapped to Cells in order of increasing carrier frequency.

The use of CI to indicate the cell for which a DCI format is intended may not be necessary for cells with different BWs because the respective DCI formats may have different sizes. For example, for 2 cells, where the PDCCH is transmitted only in one cell, the CI inclusion in the DL DCI formats is not necessary if, for example, one cell has a BW of 20 MHz and the other cell has a BW of 5 MHz. In general, the primary reason for having a different DCI format size for different BWs is the Resource Allocation (RA) IE in the DCI formats, which should have a larger size for cells with larger BWs, as it addresses a larger number of PRBs.

The transmission of DCI formats to L-UEs is supported with the conventional PDCCH structure. The PDCCH transmission to A-UEs having PDSCH reception or PUSCH transmission in the same cell is also supported with the conventional PDCCH structure. There is no differentiation between these A-UEs and the L-UEs with respect to the PDCCH transmission, although different DCI formats may be used. For ease of reference, such A-UEs will be referred to as Primary-UEs (P-UEs) and the cell with the PDCCH transmission as Primary-cell (Pcell). Conversely, A-UEs having PDSCH reception or PUSCH transmission in a cell other than the Pcell will be referred to as Secondary-UEs (S-UEs) and the corresponding cells as Secondary-cells (Scells).

For example, in FIG. 10, UEs receiving PDSCH in Cell1 are P-UEs and Cell1 is the Pcell, while UEs receiving PDSCH in Cell2 are S-UEs and Cell2 is an Scell. An A-UE can be both a P-UE and an S-UE depending on the cell (Pcell or Scell, respectively). Therefore, the classification of an A-UE as a P-UE or an S-UE is unique for each cell and may be different among cells as an A-UE can be a P-UE in the Pcell and the S-UE in an Scell.

For the PDCCH transmission to S-UEs in Scells, the conventional PDCCH structure or a separate PDCCH structure may be used. For example, for lightly loaded systems for which the capacity (first M OFDM symbols of the DL sub-frame) of the conventional PDCCH structure is not reached for scheduling P-UEs, it is also possible to support the transmission of DCI formats to S-UEs while, for heavily loaded systems, an additional PDCCH structure may be needed to support the PDCCH transmission to S-UEs.

Whether the conventional PDCCH structure or an Extended PDCCH (E-PDCCH) structure is used can be predetermined or be informed by the Node B through broadcast signaling or through UE-specific higher layer signaling. The PDCCH CCEs for an A-UE can be either in the PDCCH or in the E-PDCCH, but not in both. Whether an A-UE monitors the PDCCH or the E-PDCCH for scheduling a PDSCH or a PUSCH in a specific cell can be semi-statically configured either through higher layer signaling or through broadcast signaling.

If the E-PDCCH in the Pcell is used for scheduling a PDSCH or a PUSCH in Scells, the following is considered, in accordance with an embodiment of the present invention:

E-PDCCH Contents

The E-PDCCH provides an extension to the PDCCH and therefore, conveys information of the same nature. In addition to DCI formats for S-UEs, the E-PDCCH may include a respective PCFICH (referred to as an E-PCFICH) and a PHICH (referred to as an E-PHICH) for PUSCH transmissions in Scells served by the E-PDCCH. The E-PCFICH and the E-PHICH have the same structure as the PCFICH and the PHICH, respectively.

Frequency Resources for E-PDCCH

The DCI formats in the E-PDCCH are transmitted in CCEs, but the CCE allocation is in PRBs as the E-PDCCH is orthogonally multiplexed with the PDSCH. The PRBs for the E-PDCCH can be semi-statically or dynamically configured. A semi-static configuration of E-PDCCH PRBs ensures adequate separation in the frequency domain in order to obtain frequency diversity or that the PRBs are selected according to an interference co-ordination technique minimizing interference from adjacent cells.

Time Resources for E-PDCCH

The first E-PDCCH symbol can be the first OFDM symbol after the last actual PDCCH OFDM symbol or the first symbol after the last PDCCH OFDM symbol, assuming the maximum number of PDCCH OFDM symbols. When the first E-PDCCH symbol is the first OFDM symbol after the last actual PDCCH OFDM symbol, S-UEs decode the PCFICH to determine the E-PDCCH start. When the first E-PDCCH symbol is the first symbol after the last PDCCH OFDM symbol assuming the maximum number of PDCCH OFDM symbols, maximum E-PDCCH decoding latency results, but errors from incorrect PCFICH detection, which will lead in PDCCH decoding failure, are avoided.

The last E-PDCCH symbol can be statically, semi-statically, or dynamically configured. With static configuration, the last E-PDCCH symbol can be, for example, the seventh symbol of the DL sub-frame. With semi-static configuration, the last E-PDCCH symbol can be informed by the Node B through a broadcast channel. With dynamic configuration, the last E-PDCCH symbol can be informed through the E-PCFICH.

The range of OFDM symbols indicated by the E-PCFICH for the E-PDCCH can be different than the range of OFDM symbols indicated by the PCFICH for the PDCCH. For example, the E-PCFICH may also indicate 0 OFDM symbols for the E-PDCCH in which case the E-PCFICH and the E-PHICH may be transmitted in the PDCCH.

Figure 11:
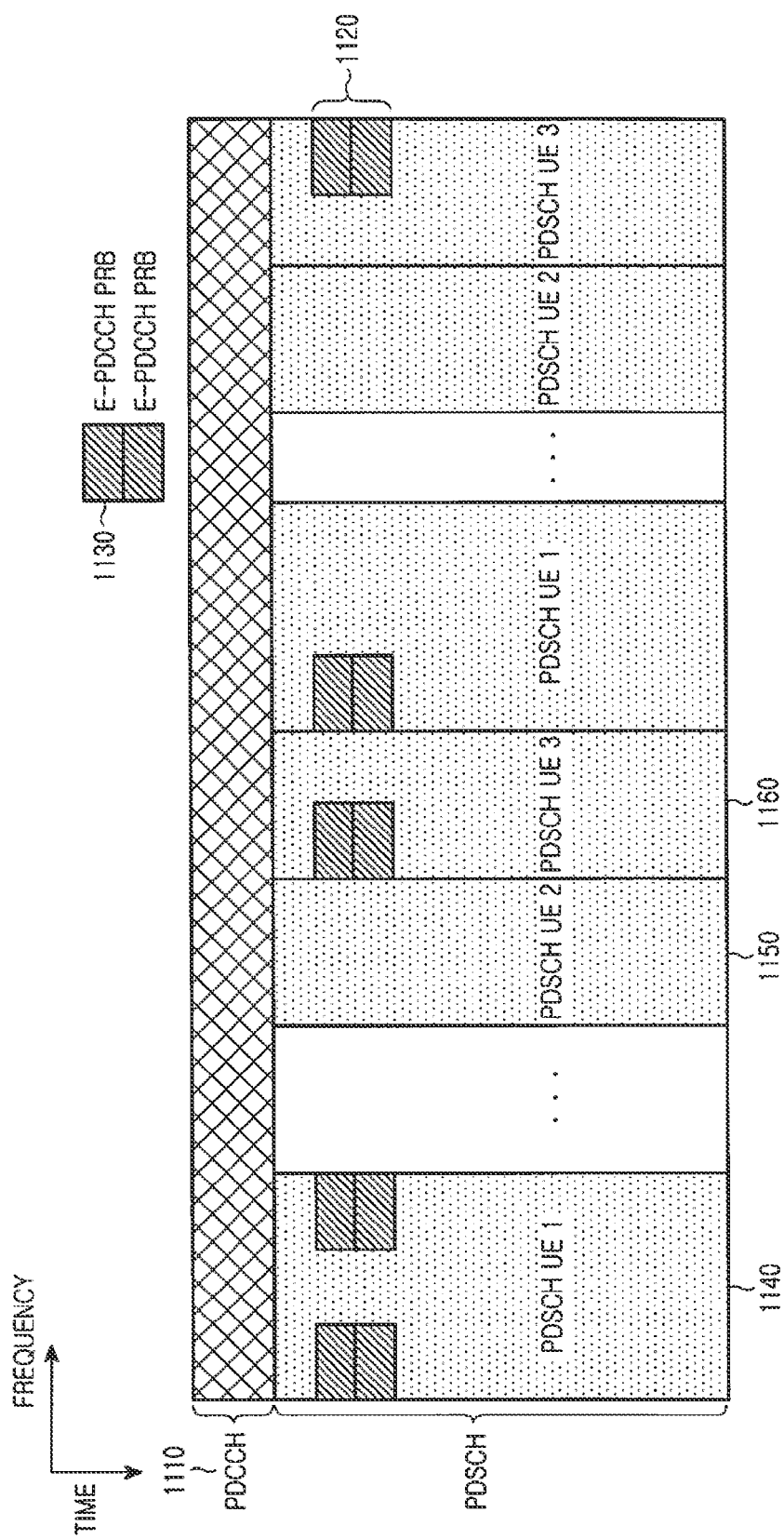
FIG. 11 is a diagram illustrating an E-PDCCH multiplexing structure where A-UEs assume a maximum PDCCH size to determine a first E-PDCCH symbol, according to an embodiment of the present invention.

FIG. 11 illustrates an E-PDCCH multiplexing structure where A-UEs assume a maximum PDCCH size to determine a first E-PDCCH symbol, according to an embodiment of the present invention.

Referring to FIG. 11, the PDCCH transmission 1110 has 2 OFDM symbols, out of a maximum of 3 PDCCH OFDM symbols. The first E-PDCCH symbol is the first OFDM symbol after the PDCCH transmission, assuming the maximum of 3 OFDM symbols. Therefore, the first E-PDCCH symbol is the fourth OFDM symbol of the DL sub-frame. The E-PCFICH transmission (not shown) is always in the first E-PDCCH symbol and, for the structure of FIG. 11, it indicates that the E-PDCCH is transmitted in 2 OFDM symbols 1120. The E-PDCCH transmission PRBs 1130 are semi-statically configured through broadcast signaling by the Node B (for example, in an SIB). The E-PDCCH transmission is multiplexed with PDSCH transmissions to various UEs, 1140, 1150, and 1160. PDSCH transmissions to L-UEs may or may not occur in PRBs used for E-PDCCH transmission. As an L-UE cannot be aware of the E-PDCCH existence, if it is assigned PDSCH reception in E-PDCCH PRBs, it will treat such PRBs as PRBs that include a PDSCH. Although this will degrade the PDSCH reception quality for the L-UEs, it is up to the Node B to determine whether or not perform such scheduling. A-UEs can be aware of the E-PDCCH PRBs and apply the appropriate rate matching for their respective PDSCH receptions.

Figure 12:
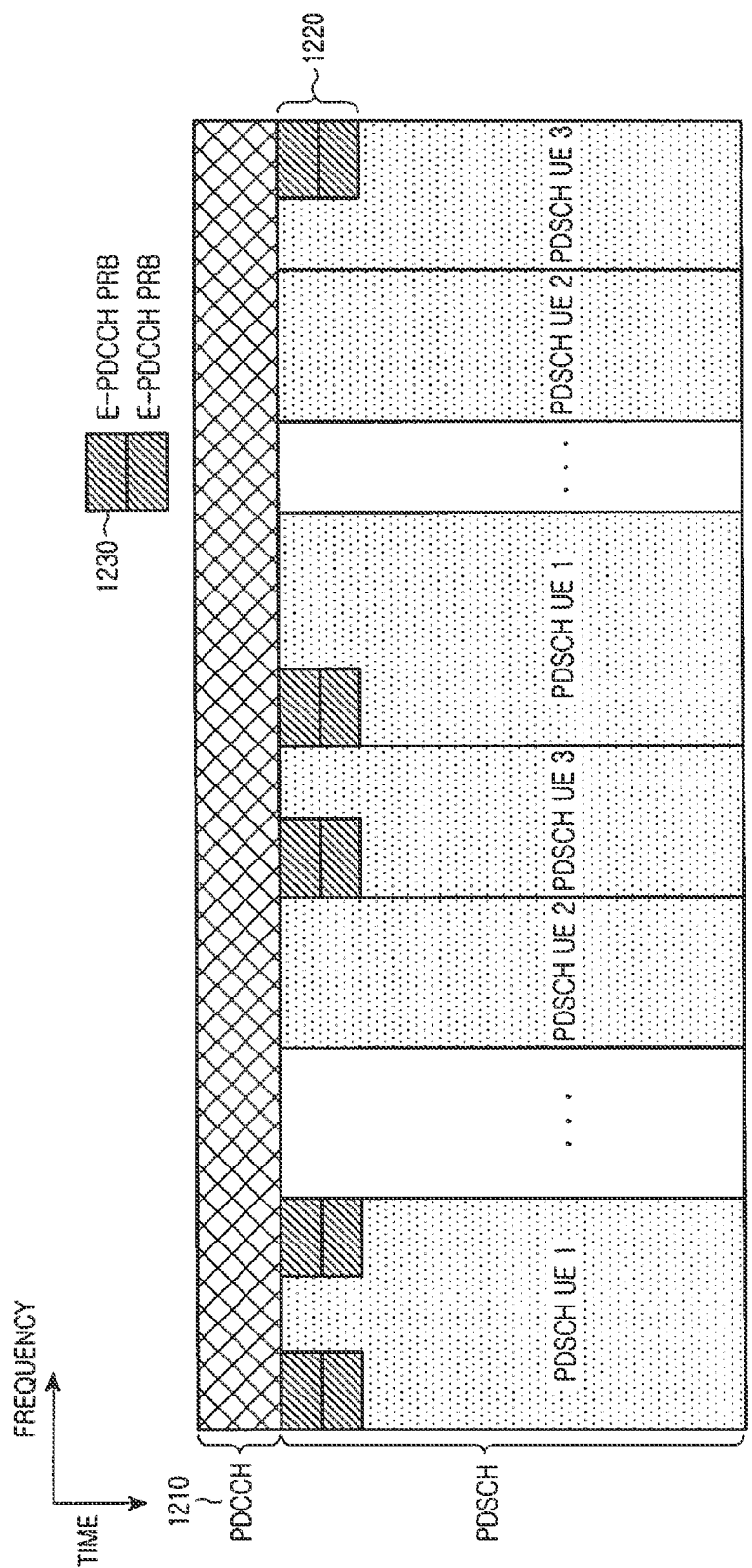
FIG. 12 is a diagram illustrating an E-PDCCH multiplexing structure where A-UEs decode a PCFICH to determine an actual PDCCH size and a first E-PDCCH symbol, according to an embodiment of the present invention.

FIG. 12 illustrates an E-PDCCH multiplexing structure where A-UEs decode a PCFICH to determine an actual PDCCH size and a first E-PDCCH symbol, according to an embodiment of the present invention.

Referring to FIG. 12, a PDCCH transmission 1210 has 2 OFDM symbols. The first E-PDCCH symbol is the third OFDM symbol, which is the first OFDM symbol after the PDCCH transmission. The E-PCFICH transmission (not shown) is always in the first E-PDCCH symbol and, in the structure illustrated in FIG. 12, it indicates that the E-PDCCH is transmitted in 2 OFDM symbols 1220. The E-PDCCH transmission PRBs 1230 are predetermined.

If the transmission of DCI formats for multiple Scells is conveyed through the E-PDCCH, in accordance with an embodiment of the present invention, all E-PDCCH CCEs are jointly considered for all Scells, instead of having a separate set of CCEs for each Scell. Therefore, there is only a single set of CCEs in the E-PDCCH, where each S-UE may have its UE-CSS and its UE-DSS. This also enables the transmission of a single E-PCFICH, instead of multiple E-PCFICH with each one corresponding to a different Scell in the E-PDCCH.

UE-CSS

In a first alternative, the UE-CSS for S-UEs is separately configured and its size, in number of CCEs, may be broadcasted by the Node B. For example, the UE-CSS size may take one of four predetermined values and the Node B broadcasts 2 bits to indicate that value (for example, through an SIB in the Pcell) or to indicate that the UE-CSS size is either 1, 2, 3, or 4 times a basic size of K CCEs. The CCEs for the UE-CSS in the E-PDCCH are placed first, i.e., before the CCEs for the UE-DSS. Once an S-UE is informed of the UE-CSS size, it needs to determine the CCEs corresponding to each Scell.

In a first option for the first alternative, the S-UE is informed of the order of Scells either through higher layer signaling, for UE-specific CI configuration, or as part of the system information for cell-specific CI configuration. This is equivalent to an S-UE being informed of the CI value for its DCI formats. In case a CI may not exist, such as, for example, when the cells have unequal BWs, the order may be in terms of decreasing BWs, e.g., the larger BWs are ordered first.

Figure 13:
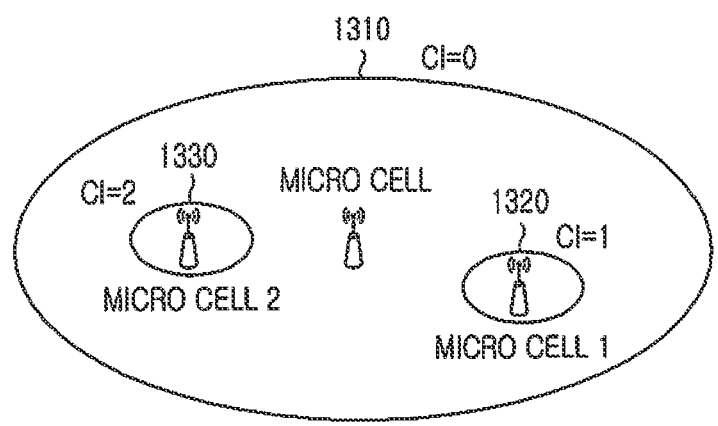
FIG. 13 is a diagram illustrating an assignment of different CI values to different cells, according to an embodiment of the present invention.

FIG. 13 is a diagram illustrating an assignment of different CI values to different cells, according to an embodiment of the present invention.

Referring to FIG. 13, the CCEs for the UE-CSS of the macro-cell 1310 are placed in the PDCCH. The CCEs for the UE-CSS for micro-cell 1 1320 are ordered first in the E-PDCCH (CI=1) and the CCEs for the UE-CSS for micro-cell 2 1330 are ordered second in the E-PDCCH (CI=2). Once the CI values have been assigned to Scells, the CCEs of the UE-CSS of S-UEs are placed in the same order in the logical domain.

Figure 14:
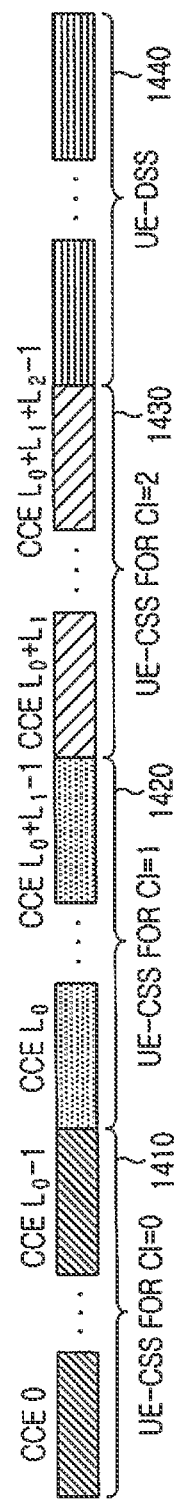
FIG. 14 is a diagram illustrating placement of CCEs for multiple UE-CSS, according to an embodiment of the present invention.

FIG. 14 is a diagram illustrating placement of CCEs for multiple UE-CSS, according to an embodiment of the present invention.

Referring to FIG. 14, the $L_1$ CCEs for a first UE-CSS of S-UEs (micro-cell 1 or for a first set of S-UEs, CI=1) are placed first 1410, followed by the $L_2$ CCEs for a second UE-CSS of S-UEs (micro-cell 2 or for a second set of S-UEs, CI=2) 1420. The placement of the CCEs for the UE-DSS 1430 occurs after the placement of the CCEs for the UE-CSS in the logical domain. The number of CCEs of the UE-CSS for S-UEs for the different CI values, denoted by $L_1$ and $L_2$ in FIG. 14, may be implicitly determined from the total UE-CSS size or may be informed by the Node B through broadcast signaling. Alternatively, the number of CCEs for the UE-CSS of S-UEs can be the same for all CI values, regardless of the DL or UL operating BW in each Scell (that is, $L_1=L_2$ in FIG. 14).

The CCEs for the UE-CSS of S-UEs are ordered as illustrated in FIG. 14 to reduce the associated number of Blind Decoding Operations (BDOs) because, for each UE-CSS, an S-UE searches a sub-set of the total set of CCEs allocated to the total UE-CSS. Moreover, by ordering the UE-CSSs for S-UEs, it is not necessary to include the CI IE in DCI formats transmitted in each UE-CSS.

In a second option for the first alternative, the ordering of individual UE-CSS for S-UEs is not applied and the respective CCEs may be distributed over the entire set of CCEs for the total UE-CSS. Thereafter, CI inclusion in the DCI formats is performed and the UE search process for DCI formats can be performed for the UE-DSS of S-UEs as will be described below.

In a second alternative, the UE-CSS remains unchanged, the S-UEs are treated as P-UEs with respect to the transmission of DCI format 3 and DCI format 1C in Scells, and there is no differentiation of UEs into different categories with respect to the UE-CSS.

The PCH can be transmitted to all S-UEs in the cell with the PDCCH transmission (Pcell).

Assuming no transmission of synchronization signals from cells (such as micro-cells) without PDCCH transmission (Scells), S-UEs acquire the synchronization signal of the cell (such as a macro-cell) with PDCCH transmission (Pcell). Thereafter, the RACH process is completed through the Pcell and no additional RACH response signaling, corresponding to cells without PDCCH transmission (Scells), is necessary.

The SIBs for cells (such as micro-cells) without PDCCH transmission (Scells) can also be transmitted from the cell (such as macro-cell) with PDCCH transmission (Pcell) using different CRC masks in DCI format 1C to indicate the cell corresponding to the SIB transmission.

DCI format 3 multiplexes TPC commands corresponding to UEs in the cell (such as a macro-cell) with PDCCH transmission (Pcell) and to UEs in the cells (such as micro-cells) without PDCCH transmission (Scells).

Accordingly, P-UEs have their UE-CSS for DCI format transmission in the PDCCH as in a backward compatible system including a single cell. For S-UEs, either a new UE-CSS is defined in the E-PDCCH, as described above in the first alternative, or no additional UE-CSS is defined and all UEs (P-UEs and S-UEs) use the same UE-CSS in the PDCCH, as described above in the second alternative.

UE-DSS

For the UE-DSS and single-cell operation, using the previously defined notation, the CCEs corresponding to a PDCCH candidate in are given by Equation (2).

$$S_k^{(L)} = L \cdot \{(Y_k+m) \bmod \lfloor N_{CCE,k}/L \rfloor\} + i \quad (2)$$

In Equation (2), $N_{CCE,k}$ is the total number of CCEs in sub-frame k, $i=0, \ldots, L-1$, $m=0, \ldots, M^{(L)}-1$, and $M^{(L)}$ is the number of candidates in the UE-DSS.

The above UE-DSS structure leads to identical UE-DSSs for different cells (Pcell or Scells) as they are assumed to share the same UE-DSS in the E-PDCCH (or in the PDCCH when it supports the transmission of DCI formats for multiple cells).

In order to provide distinct UE-DSS, in addition to the UE_ID, in accordance with an embodiment of the present invention, the UE-DSS also depends on the Cell_ID. This can substantially decrease the probability that a DCI format transmission is blocked due to the unavailability of CCEs in the UE-DSS. Reducing this blocking probability increases the probability that a PDSCH or PUSCH scheduling occurs and therefore, improves the respective DL or UL system throughput and enhances operating quality and reliability.

The Cell_ID may be the CI value allocated to each cell. For example, the UE may be informed of the Cell_ID through higher layer signaling. At least when the cells have equal BWs (and a respective CI is defined), the Cell_ID may be the same as the respective CI. The UE may obtain the Cell_ID during initial synchronization with the respective cell, or if the cell does not transmit synchronization signals, the UE may obtain the respective Cell_ID through higher layer signaling from the cell transmitting synchronization signals after synchronization. Additionally, the Cell_ID may be UE-specific and informed to each UE through higher layer signaling. For example, for 3 cells, instead of having three different respective Cell_IDs, the Cell_ID for each UE can depend on the number of cells the UE is configured for. If UE1 is configured for Cell1 and Cell2, the respective Cell_IDs can be Cell_ID1 and Cell_ID2. If UE2 is configured for Cell2 and Cell3, the respective Cell_IDs can also be Cell_ID1 and Cell_ID2.

The following example further demonstrates the occurrence of transmission blocking for a DCI format. Assuming that DCI formats to a UE are transmitted with 4 CCEs, then, as there are only 2 candidates in the UE-DSS for this CCE aggregation level, transmission of DCI formats for at most 2 cells can be supported (or one cell, for both PDSCH reception and PUSCH transmission). Also, due to randomization through interleaving, the UE-DSSs for different UEs may have overlapping CCEs, and for this reason it will often be likely that the transmission of a DCI format for only a single cell can be supported.

An embodiment of the invention to construct separate UE-DSS for each cell considers that the initialization of the variable $Y_k$ includes the Cell_ID. When $0 \oplus 0 = 0$, $0 \oplus 1 = 1$, $1 \oplus 0 = 1$, $1 \oplus 1 = 0$, where $\oplus$ denotes the binary modulo add operation, an A-UE receives multiple PDSCH or transmits multiple PUSCH in multiple cells while the respective DCI formats are transmitted in a single cell, and $Y_{-1} = (UE\_ID) \oplus (Cell\_ID) \neq 0$ for the UE-DSS of the respective cell.

Figure 15:
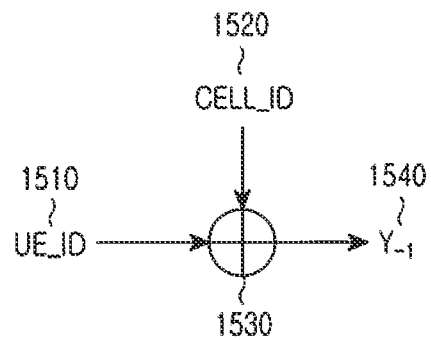
FIG. 15 is a diagram illustrating an operation for generating a distinct UE-DSS for each cell through a respective distinct initialization of a variable determining the location of a UE-DSS, according to an embodiment of the present invention.

FIG. 15 illustrates an initialization of a variable $Y_k$ with a Cell_ID according to an embodiment of the present invention.

Referring to FIG. 15, the binary UE_ID 1510 and the binary Cell_ID 1520 are added by a binary adder 1530 to provide the initial value $Y_{-1}$ 1540 of the variable $Y_k$, randomizing the CCEs in the UE-DSS in sub-frame k for DCI formats corresponding to the respective cell. Assuming a 16-bit UE ID, the requirement $Y_{-1} \neq 0$ prevents the use of a small number of UE_IDs, which has only a minor impact on the total number of $2^{16} = 65536$ available UE Ids, considering that the total number of cells for which the DCI formats are transmitted in a single cell is less than 10. Also, as the variable $T_k$ depends on the Cell_ID, it should be denoted as $Y_k^c$ with $c=0, 1, \ldots, N_c-1$, where $N_c$ is the number of cells for which the respective DCI formats are conveyed in a single cell (Pcell).

In another embodiment of the invention to construct separate UE-DSS for each cell, denoting as $f(c)$ a function of the CI or of the Cell_ID for cell c, each UE-DSS can be obtained by Equation (3).

$$S_{k,c}^{(L)} = L \cdot \{(Y_k+m+f(c)) \bmod \lfloor N_{CCE,k}/L \rfloor\} + i \quad (3)$$

One condition for $S_{k,c}^{(L)}$ may be that the UE-DSS corresponding to PDSCH/PUSCH scheduling in the Pcell should be defined as for L-UEs. This is useful for maintaining the legacy operation when all cells, other than the Pcell, are deactivated. Therefore, if $c_P$ is the CI or Cell_ID for the Pcell, then $f(c_P)=0$.

For CI or Cell_ID values c other than $c_P$, $f(c)$ may be determined as $f(c)=1, 2, \ldots, 7$ (assuming a 3-bit CI), which can be ranked in ascending order based on the assigned CI values. Only active cells are considered in order to reduce the self-blocking probability for the UE-DSS of an A-UE. The exact values for Scells (excluding the Pcell) are not material as long as they are consecutive and the condition $f(c_P)=0$ is satisfied for the Pcell. For example, for CI or Cell_ID values c other than $c_P$, the function $f(c)$ may be determined as $f(c)=-3, -2, -1, 1, 2, 3$, or in general, by alternating assignments of positive and negative integer values in a consecutive manner around $f(c_P)=0$ (starting from 1, and continuing with $-1, 2, -2$, and so on).

The transmission of DCI formats for scheduling in multiple Scells increases the number of BDOs an A-UE performs. Without any restrictions in the locations of these possible DCI formats, this increase in the number of BDOs is linear with the number of Scells. This increases the UE receiver complexity and also increases the probability of a false CRC test (resulting to a UE incorrectly considering a DCI format as intended for it).

Several alternative designs exist for reducing the number of BDOs. All consider that the possible locations of DCI formats in the multiple UE-DSSs for a reference UE are mutually dependent. In addition to reducing the number of BDOs and CRC tests, these designs maintain the same receiver architecture (bank of decoders) for the basic single-cell UE-DSS decoding process regardless of the number of cells a UE is configured with.

A first design uses the same aggregation level L for all DCI formats to a reference UE. If for the reference cell $c_1$ a candidate in is identified by the UE in position $L \cdot \{(Y_k^{c_1}+m) \bmod \lfloor N_{CCE,k}/L \rfloor\} + i$, $m=0, \ldots, M^{(L)}-1$, $i=0, \ldots, L-1$, an additional cell $c_2$ can have a potential candidate n in position $L \cdot \{(Y_k^{c_2}+n) \bmod \lfloor N_{CCE,k}/L \rfloor\} + i$, $n=0, \ldots, M^{(L)}-1$. Therefore, after the UE identifies a DCI format for cell $c_1$, it performs an additional $M^{(L)}$ BDOs (for $n=0, \ldots, M^{(L)}-1$) to determine if it also has one for cell $c_2$.

A second design enables different aggregation levels to be used for the PDCCH, but imposes a restriction in the possible candidates for each aggregation level. If for cell $c_1$ a PDCCH is identified for candidate m in position $L_1 \cdot \{(Y_k^{c_1}+m) \bmod \lfloor N_{CCE,k}/L_1 \rfloor\}+i$, $m=0, \ldots, M^{(L)}-1$, $i=0, \ldots, L_1-1$, an additional cell $c_2$ can have a potential PDCCH candidate in position $L_2 \cdot \{(Y_k^{c_2}+m \cdot \bmod(\min(L_1, L_2))) \bmod \lfloor N_{CCE,k}/L_2 \rfloor\}+j$, $j=0, \ldots, L_2-1$. Therefore, after the UE identifies a PDCCH for cell $c_1$, it performs a number additional BDOs equal to the number of possible aggregation levels to determine if it also has a PDCCH for cell $c_2$. In accordance with an embodiment of the present invention, this number of additional BDOs is 4, as the possible aggregation levels are $\{1,2,4,8\}$. This process can directly extend to additional cells.

A third design is a combination of the first and second designs, where the aggregation level used for the PDCCH in a reference cell (Pcell) affects the possible aggregation levels for the PDCCH for the remaining cells (Scells) for which a UE is configured. For example, the aggregation levels used for the PDCCH for the remaining cells may only have the same or the next larger value relative to the one used for the PDCCH for the reference cell (if L=8 is used in the reference cell, then L=8 is also used in the remaining cells). Additionally, the position of the PDCCH for the reference cell affects the possible PDCCH positions for the remaining cells. For example, if the PDCCH position for the reference cell is odd or even numbered, then the position of the potential PDCCH for the remaining cells is also odd or even numbered, respectively. Therefore, for the third design, if for the cell $c_1$ a PDCCH is identified for candidate m in position $L_1 \cdot \{(Y_k^{c_1}+m) \bmod \lfloor N_{CCE,k}/L_1 \rfloor\}+i$, with $L_1 \in \{1, 2, 4, 8\}$, $m=0, \ldots, M^{(L_1)}-1$, $i=0, \ldots, L_1-1$, an additional cell $c_2$ can have a potential PDCCH candidate in position $L_2 \cdot \{(Y_k^{c_2}+2n+\bmod(m,2))) \bmod \lfloor N_{CCE,k}/L_2 \rfloor\}+j$, $L_2 \in \{L_1, 2L_1\}$ if $L_1 < 8$, $L_2 = L_1$ if $L_1 = 8$, $n=0, \ldots, M^{(L_2)}/2-1$, $j=0, \ldots, L_2-1$. This process can directly extend to additional cells.

Additional restrictions for the third design are possible, for example, by requiring the same CCE aggregation level to be used in all cells. The potential combinations are covered by combinations of the principles for the first and second designs as described by the third design.

The previously described PDCCH extension was compatible with existing single-cell communications. However, PDCCH extension may also be supported in a non-compatible manner. For this case, in accordance with an embodiment of the present invention, a different interpretation of the PCFICH values and a different configuration of the UE-CSS and UE-DSS may apply. Unlike legacy systems for which the PCFICH conveys 3 predetermined values for the PDCCH size, such as for example 1, 2, or 3 OFDM symbols, the PCFICH for non-compatible PDCCH extension can convey more values, which are not predetermined but can semi-statically vary. The Node B may broadcast a configuration of PDCCH sizes, from a set of possible configurations, and the PCFICH may then simply indicate one size from the broadcasted configuration of PDCCH sizes. For example, the Node B may indicate one of the $\{1, 2, 3, 4\}$, $\{2, 3, 4, 5\}$, $\{3, 4, 5, 6\}$ and $\{4, 5, 6, 7\}$, in number of OFDM symbols, for the PDCCH size configuration. The 2 bits in the PCFICH can then be used to inform the UEs of the PDCCH size within the configuration broadcasted by the Node B.

Figure 16:
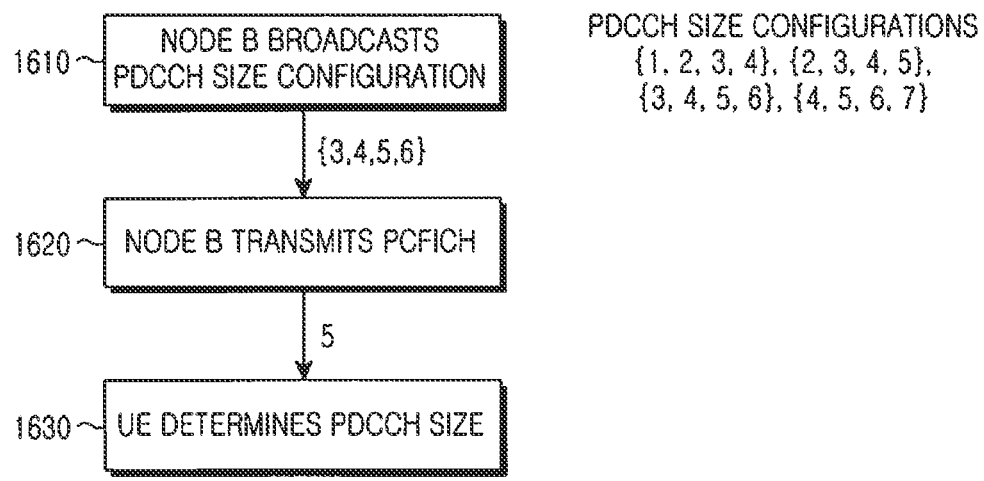
FIG. 16 is a diagram illustrating an extension of a PDCCH size by configuring a set of possible values and using a PCFICH to indicate one value in the set, according to an embodiment of the present invention.

FIG. 16 illustrates a PDCCH size extension by configuring a set of possible values and using a PCFICH to indicate one value in the set, according to an embodiment of the present invention.

Referring to FIG. 16, the Node B broadcasts 2 bits, for example, "10", to indicate the PDCCH size configuration of $\{3, 4, 5, 6\}$ symbols 1610. The PDCCH size configuration may take effect at a predetermined sub-frame after the Node B broadcasts it, such as, for example, in the first sub-frame S, such that modulo(S, 40)=0. The PCFICH transmitted in each sub-frame indicates an element from the PDCCH size configuration set, such as, for example, the third element 1620. The UE determines the PDCCH size based on both the broadcasted PDCCH size configuration and the PCFICH value 1630.

In addition to configuring a total PDCCH size, an individual size of the UE-CSS or UE-DSS can also be configured. For example, the Node B may broadcast the UE-CSS size. Consequently, A-UEs can know that the UE-CSS size may have one of four predetermined values and the Node B simply broadcasts 2 bits to indicate that value or to indicate that the UE-CSS size is 1, 2, 3, or 4 times the basic UE-CSS size of 16 CCEs. The indication of the UE-CSS size may also be implicit based on the PDCCH configuration size. For example, if the Node B broadcasts the third PDCCH configuration size in FIG. 16, A-UEs can identify that the UE-CSS is 3 times the basic UE-CSS size of 16-CCEs, i.e., the UE-CSS size is 48 CCEs or it is determined by the third element in a configured set of UE-CSS sizes such as, for example, a set of $\{16, 28, 36, 44\}$ CCEs.

Figure 17:
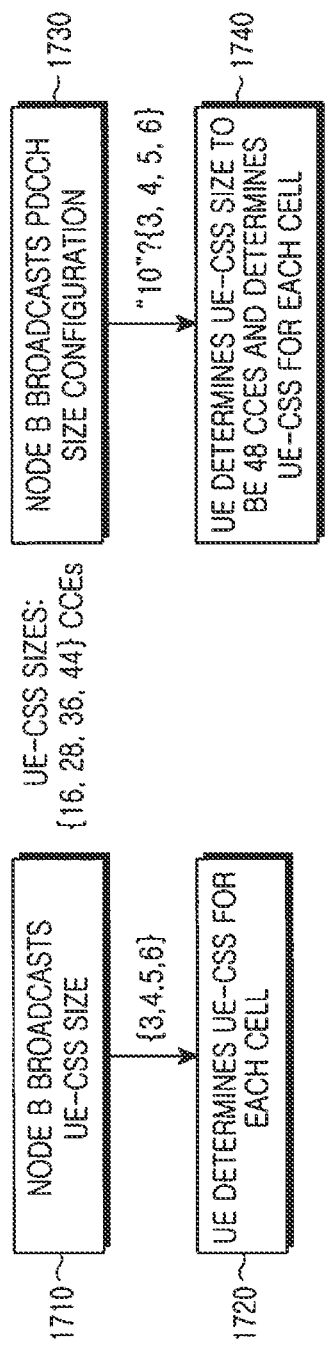
FIG. 17 is a diagram illustrating a combination of explicit and implicit indication by a Node B of a UE-CSS size, according to an embodiment of the present invention.

FIG. 17 illustrates explicit and implicit indication by the Node B of a UE-CSS size to A-UEs, according to an embodiment of the present invention.

Referring to FIG. 17, for explicit indication, the Node B informs A-UEs of the UE-CSS size through a broadcast channel, e.g., an SIB transmission. For example, the Node B transmits 2 bits with a value "10" to indicate 36 CCEs, which is the third element in a set of 4 possible UE-CSS sizes 1710. A-UEs, upon reception of that broadcast information, determine the UE-CSS for each cell 1720, as described above, for PDCCH extension compatible with legacy systems. For implicit indication, the Node B broadcasts the PDCCH size configuration (for example, in an SIB), as described in FIG. 17, and based on this configuration, A-UEs determine the UE-CSS size and the UE-CSS for each cell. For example, the Node B may broadcast the third PDCCH size configuration 1730 and the then A-UEs determine the UE-CSS size to be 36 CCEs 1740.

While the present invention has been shown and described with reference to certain embodiments thereof, it will be understood by those skilled in the art that various changes in form and details may be made therein without departing from the spirit and scope of the present invention as defined by the appended claims, and any equivalents thereof.

What is claimed is:

1. A method for receipt of downlink control information (DCI) in a communication system, the method comprising:
   receiving information representative of presence of carrier indicator on higher layer signaling from a Node B;
   receiving information representative of at least one cell index on higher layer signaling from the Node B;
   defining a user equipment (UE) specific search space based on an aggregation level, a UE ID, and at least one carrier indicator value, where the UE specific search space comprises a set of physical downlink control channel (PDCCH) candidates based on the aggregation level; and
   decoding at least one PDCCH including at least one DCI respectively based on the UE ID;

wherein the at least one carrier indicator value is based on the at least one cell index, and wherein the UE specific search space is identified by parameters of the UE specific search space for a single cell.

2. The method of claim 1, wherein the at least one carrier indicator value is same as the at least one cell index.

3. The method of claim 1, wherein the information representative of presence of carrier indicator on higher layer signaling is UE specific.

4. The method of claim 1, wherein the information representative of at least one cell index on higher layer signaling is UE specific.

5. The method of claim 1, wherein if information representative of absence of carrier indicator is received, further comprising:
defining the UE specific search space based on the aggregation level and the UE ID;
decoding at least one PDCCH including at least one DCI respectively based on the UE ID; and
acquiring the at least one DCI.

6. The method of claim 1, further comprising:
monitoring a common search space for PDCCH without carrier indicator.

7. The method of claim 1, further comprising steps of:
defining a common search space based on the aggregation level;
decoding at least one PDCCH including at least one DCI respectively based on the UE ID; and
acquiring the at least one DCI,
wherein the at least one DCI does not contain a carrier indicator.

8. The method of claim 1, wherein at least one format of all DCI formats does not contain carrier indicator regardless of the information representative of presence of carrier indicator.

9. The method of claim 8, wherein the at least one format of all DCI formats is at least one DCI format included in at least one PDCCH over common search space.

10. The method of claim 1, further comprising:
receiving information representative of scheduling multiple cells through a single cell on higher layer signaling.

11. An apparatus for receipt of downlink control information (DCI) in a communication system, the apparatus comprising:
a receiver configured to receive information representative of presence of carrier indicator on higher layer signaling from a Node B, and to receive information representative of at least one cell index on higher layer signaling from the Node B; and
a controller configured to define a UE specific search space based on an aggregation level, a UE ID, and at least one carrier indicator value, where the UE specific search space comprises a set of physical downlink control channel (PDCCH) candidates based on the aggregation level, and to decode at least one PDCCH including at least one DCI respectively based on the UE ID;
wherein the at least one carrier indicator value is based on the at least one cell index, and
wherein the UE specific search space is identified by parameters of the UE specific search space for a single cell.

12. The apparatus of claim 11, wherein the at least one carrier indicator value is same as the at least one cell index.

13. The apparatus of claim 11, wherein the information representative of presence of carrier indicator on higher layer signaling is UE specific.

14. The apparatus of claim 11, wherein the information representative of at least one cell index on higher layer signaling is UE specific.

15. The apparatus of claim 11, wherein if information representative of absence of carrier indicator is received, further configured to:
define the UE specific search space based on the aggregation level and the UE ID;
decode at least one PDCCH including at least one DCI respectively based on the UE ID; and
acquire the at least one DCI.

16. The apparatus of claim 11, further configured to:
monitor a common search space for PDCCH without carrier indicator.

17. The apparatus of claim 11, further configured to:
define a common search space based on the aggregation level;
decode at least one PDCCH including at least one DCI respectively based on the UE ID; and
acquire the at least one DCI,
wherein the at least one DCI does not contain a carrier indicator.

18. The apparatus of claim 11, wherein at least one format of all DCI formats does not contain carrier indicator regardless of the information representative of presence of carrier indicator.

19. The apparatus of claim 18, wherein the at least one format of all DCI formats is at least one DCI format included in at least one PDCCH over common search space.

20. The apparatus of claim 11, further configured to:
receive information representative of scheduling multiple cells through a single cell on higher layer signaling.

21. A method for transmission of downlink control information (DCI) in a communication system, the method comprising:
transmitting information representative of presence of carrier indicator on higher layer signaling to a user equipment (UE); and
transmitting information representative of at least one cell index on higher layer signaling to the UE,
wherein a UE specific search space is defined based on an aggregation level, a UE ID, and at least one carrier indicator value, where the UE specific search space comprises a set of physical downlink control channel (PDCCH) candidates based on the aggregation level,
wherein at least one PDCCH comprises at least one DCI respectively based on the UE ID,
wherein the at least one carrier indicator value is based on the at least one cell index, and
wherein the UE specific search space is identified by parameters of the UE specific search space for a single cell.

22. The method of claim 21, wherein the at least one carrier indicator value is same as the at least one cell index.

23. The method of claim 21, wherein the information representative of presence of carrier indicator on higher layer signaling is UE specific.

24. The method of claim 21, wherein the information representative of at least one cell index on higher layer signaling is UE specific.

25. The method of claim 21, wherein if information representative of absence of carrier indicator is transmitted, the UE specific search space is defined based on the aggregation level and the UE ID, and wherein at least one PDCCH comprises at least one DCI respectively based on the UE ID.

26. The method of claim 21, wherein a common search space for PDCCH without carrier indicator is defined.

27. The method of claim 21, wherein a common search space is defined based on the aggregation level, and
wherein at least one PDCCH comprises at least one DCI respectively based on the UE ID, and
wherein the at least one DCI does not contain a carrier indicator.

28. The method of claim 21, wherein at least one format of all DCI formats does not contain carrier indicator regardless of the information representative of presence of carrier indicator.

29. The method of claim 28, wherein the at least one format of all DCI formats is at least one DCI format included in at least one PDCCH over common search space.

30. The method of claim 21, further comprising:
transmitting information representative of scheduling multiple cells through a single cell based on higher layer signaling.

31. An apparatus for transmission of downlink control information (DCI) in a communication system, the apparatus comprising:
a transmitter configured to transmit information representative of presence of carrier indicator on higher layer signaling to a user equipment (UE), and to transmit information representative of at least one cell index on higher layer signaling to the UE; and
a controller configured to control the transmitter to transmit, to the UE, at least one DCI to the UE within a UE specific search space that is defined based on an aggregation level, a UE ID, and at least one carrier indicator value, where the UE specific search space comprises a set of Physical Downlink Control Channel (PDCCH) candidates based on the aggregation level,
wherein at least one PDCCH comprises the at least one DCI respectively based on the UE ID,
wherein the at least one carrier indicator value is based on the at least one cell index, and
wherein the UE specific search space is identified by parameters of the UE specific search space for a single cell.

32. The apparatus of claim 31, wherein the at least one carrier indicator value is same as the at least one cell index.

33. The apparatus of claim 31, wherein the information representative of presence of carrier indicator on higher layer signaling is UE specific.

34. The apparatus of claim 31, wherein the information representative of at least one cell index on higher layer signaling is UE specific.

35. The apparatus of claim 31, wherein if information representative of absence of carrier indicator is transmitted, the UE specific search space is defined based on the aggregation level and the UE ID, and
wherein at least one PDCCH comprises at least one DCI respectively based on the UE ID.

36. The apparatus of claim 31, wherein a common search space for PDCCH without carrier indicator is defined.

37. The apparatus of claim 31, wherein a common search space is defined based on the aggregation level, and
wherein at least one PDCCH comprises at least one DCI respectively based on the UE ID, and
wherein the at least one DCI does not contain a carrier indicator.

38. The apparatus of claim 31, wherein at least one format of all DCI formats does not contain carrier indicator regardless of the information representative of presence of carrier indicator.

39. The apparatus of claim 38, wherein the at least one format of all DCI formats is at least one DCI format included in at least one PDCCH over common search space.

40. The apparatus of claim 31, further configured to:
transmit information representative of scheduling multiple cells through a single cell on higher layer signaling.

* * * * *